United States Patent [19]
Yamauchi et al.

[11] Patent Number: 5,118,261
[45] Date of Patent: Jun. 2, 1992

[54] AIR CONDITIONING METHOD AND APPARATUS

[75] Inventors: Shiro Yamauchi; Takeaki Hanada, both of Amagasaki, Japan

[73] Assignee: Mitsubishi Denki Kabushiki Kaisha, Tokyo, Japan

[21] Appl. No.: 614,879

[22] Filed: Nov. 16, 1990

[30] Foreign Application Priority Data

Nov. 16, 1989 [JP] Japan .................. 1-300533

[51] Int. Cl.$^5$ .............................................. F04B 37/02
[52] U.S. Cl. .................. 417/48; 204/130; 204/421; 204/430; 236/44 A
[58] Field of Search ............. 236/44 A, 44 E, 44 R; 204/129 X, 130 X, 301, 421 X, 425, 427, 430; 417/48

[56] References Cited

U.S. PATENT DOCUMENTS 4,967,295 10/1990 Yamauchi et al. .............. 236/44 R

FOREIGN PATENT DOCUMENTS 0276611 11/1988 Japan .................. 236/44 A
0291105 11/1988 Japan .................. 236/44 A Primary Examiner—William E. Wayner
Attorney, Agent, or Firm—Wolf, Greenfield & Sacks

[57] ABSTRACT

An air conditioning method and apparatus for electrochemically regulating a humidity and an oxygen-concentration within a case by the use of an ion exchanger polymer electrolyte. Where the humidity and the oxygen-concentration within the case are reduced, a cell comprising an anode, a cathode and an anion exchanger polymer electrolyte sandwiched between both the electrodes is arranged so that a surface of the anode is in contact with an atmospheric air outside the case and a surface of the cathode is in contact with an ambient atmosphere inside the case and DC voltage is applied between both the electrodes. On the other hand, where the humidity and the oxygen-concentration within the case are increased, the cell having the similar construction is arranged so that the surface of the anode is in contact with the ambient atmosphere inside the case and the surface of the cathode is in contact with the atmospheric air outside the case and DC voltage is applied between both the electrodes.

12 Claims, 3 Drawing Sheets

AIR CONDITIONING METHOD AND APPARATUS

BACKGROUND OF THE INVENTION

1. Field of the Invention

The present invention relates to an air conditioning method and apparatus for electro-chemically controlling the humidity and the oxygen-concentration within a case by the use of an ion exchanger polymer electrolyte.

2. Description of Related Art

The condensing method, in which a temperature is lowered to condense steam in an atmosphere, and the absorbing method, in which steam is absorbed by a desiccating agent such as silica gel, have been known for the conventional dehumidifying method. The condensing method has exhibited a problem in that it is not suitable for the use where it is not appropriate to lower a temperature while the absorbing method has exhibited a problem in that the regeneration treatment is required.

A method using an ion exchanger polymer electrolyte comprising a cation exchanger polymer electrolyte (Japanese Patent Application Laid-Open No. Sho 61-216714) has been known as an air conditioning method, in particular a dehumidifying method, solving such problems.

FIG. 1 shows a working condition of the conventional dehumidifying method disclosed in Japanese Patent Application Laid-Open No. Sho 61-216714. Referring now to FIG. 1, reference numeral 6 designates a case for an object to be dehumidified. The case 6 is provided with a cell 10 having an anode 2, a cathode 3 and a cation exchanger polymer electrolyte 1 sandwiched between both the electrodes 2, 3 so that the cell 10 may pass through a wall of the case 6. A surface of the anode 2 is in contact with an ambient atmosphere 7 inside the case 6 while a surface of the cathode 3 is in contact with an atmospheric air 8. The anode 2 and the cathode 3 are connected to a DC power source 4 through lead wires 5 and DC voltage is applied between both the electrodes 2, 3 as far as hydrogen is not generated from the cathode 3.

Next, the operation is described. Steam in the ambient atmosphere 7 acts upon the anode 2 in such a manner as expressed by the following equation (1):

$$2H_2O \rightarrow O_2 + 4H^+ + 4e^- \tag{1}$$

Oxygen formed by this reaction is left in the case 6. On the other hand, hydrogen ions formed are transferred onto the cathode 3 through the cation exchanger polymer electrolyte 1 where hydrogen ions act upon oxygen in the atmospheric air 8 in such a manner as expressed by the following equation (2):

$$O_2 + 4H^+ + 4e^- \rightarrow 2HO \tag{2}$$

As a result, water (steam) is decomposed on the side of the anode 2, that is, the side of the ambient atmosphere 7, while water is formed on the side of the cathode 3, that is, the side of the atmospheric air 8. And, as a whole, water is transferred from the ambient atmosphere 7 inside the case 6 to the atmospheric air 8 and thus an inside of the case 6 is dehumidified.

The above described air conditioning method (dehumidifying method) using the cation exchanger polymer electrolyte has exhibited the following problems: Steam is reduced (the humidity is reduced) and the oxygen-concentration is increased on the side of the anode 2, in short, in the ambient atmosphere 7 inside the case 6 while steam is increased (the humidity is increased) and the oxygen-concentration is reduced on the side of the cathode 3, in short, on the side of the atmospheric air 8. Where it is desired to reduce both the humidity and the oxygen-concentration in order to suppress the progress of corrosion, a problem has occurred in that the above described air conditioning method using the cation exchanger polymer electrolyte can not be applied.

SUMMARY OF THE INVENTION

The present invention has been achieved in order to solve the above-described problems.

It is an object of the present invention to provide an air conditioning method and apparatus capable of simultaneously reducing a humidity and an oxygen-concentration within a case.

It is another object of the present invention to provide an air conditioning method and apparatus capable of simultaneously increasing a humidity and an oxygen-concentration within a case.

It is still another object of the present invention to provide an air conditioning method and apparatus capable of simultaneously reducing a humidity and an oxygen-concentration, whereby preventing a progress of corrosion.

It is a further object of the present invention to provide an air conditioning method and apparatus capable of simultaneously increasing a humidity and an oxygen-concentration, whereby being applied to the endurance test for corrosion of electronic instruments and the like.

Where the humidity and the oxygen-concentration within the case are reduced according to the present invention, a cell comprising an anode, a cathode and an anion exchanger polymer electrolyte sandwiched between both the electrodes so that a surface of the anode may be in contact with an atmosphere outside the case and a surface of the cathode may be in contact with an atmosphere inside the case and DC voltage is applied between both the electrodes. On the other hand, where the humidity and the oxygen-concentration within the case are increased according to the present invention, the cell having the similar construction is arranged so that the surface of the anode may be in contact with the atmosphere inside the case and the surface of the cathode may be in contact with the atmosphere outside the case and DC voltage is applied between both the electrodes.

It is necessary to set the DC voltage to be applied between both the electrodes within a range generating no hydrogen from the cathode, concretely a range of 2 V to 3 V. A film made of fluororesin having an amino group can be used for the anion exchanger polymer electrolyte and a porous thin film made of platinum can be used for the anode and the cathode.

The above and further objects and features of the invention will more fully be apparent from the following detailed description with accompanying drawings.

DESCRIPTION OF THE PREFERRED EMBODIMENTS

The present invention will be below described in detail with reference to the drawings.

Figure 1:
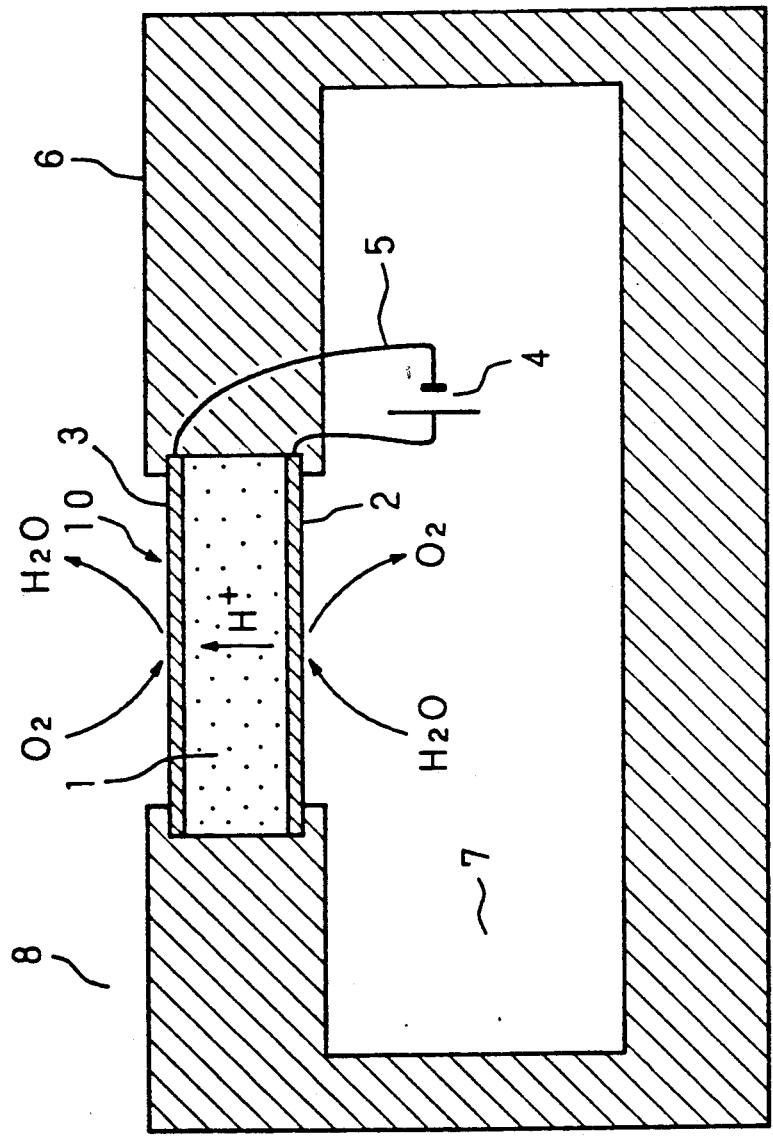
FIG. 1 is a sectional view showing a working condition of the conventional air conditioning method.
Figure 2:
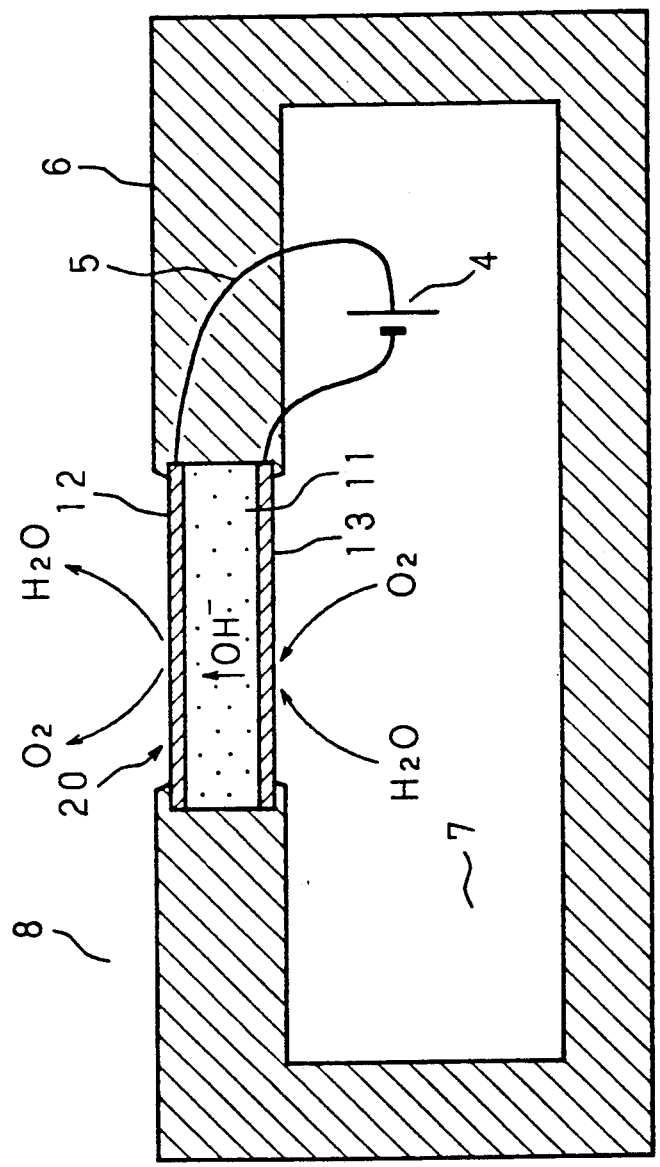
FIG. 2 is a sectional view showing a working condition of a first preferred embodiment according to the present invention.

FIG. 2 shows a working condition of the first preferred embodiment according to the present invention. Referring to FIG. 2, reference numeral 6 designates a case to be air conditioned. The case 6 is provided with a cell 20 having an anode 12, a cathode 13 and an anion exchanger polymer electrolyte 11 sandwiched between both the electrodes 12, 13 so that the cell 20 may pass through a wall of the case 6. A surface of the cathode 13 is in contact with an ambient atmosphere 7 inside the case 6 while a surface of the anode 12 is in contact with an atmospheric air 8 which is an atmosphere outside the case 6. The anion exchanger polymer electrolyte 11 is formed of a film made of fluororesin having an amino group and both the anode 12 and the cathode 13 are formed of a porous thin film made of platinum. The anode 12 and the cathode 13 are connected to a DC power source 4 through lead wires 5 and DC voltage within a range bringing about no generation of hydrogen from the cathode 13, concretely a range of 2 V to 3 V, is applied between both the electrodes 12, 13.

Next, the operation is described.

A reaction expressed by the following equation (3) occurs between steam and oxygen in the ambient atmosphere 7 inside the case 6 on the cathode 13.

$$2H_2O + O_2 + 4e^- \rightarrow 4OH^- \tag{3}$$

Hydroxide ions formed by this reaction are transferred from the cathode 13 toward the anode 12 through the anion exchanger polymer electrolyte 11. And, a reaction expressed by the following equation (4) occurs on the anode 12.

$$4OH^- \rightarrow 2H_2O + O_2 + 4e^- \tag{4}$$

As a result, water (steam) and oxygen are decomposed on the side of the cathode 13, that is, the side of the ambient atmosphere 7, while water and oxygen are formed on the side of the anode 12, that is, the side of the atmospheric air 8. As a whole, steam and oxygen in the ambient atmosphere 7 are transferred to the atmospheric air 8 through the cell 20.

Accordingly, in this first preferred embodiment the humidity and the oxygen-concentration within the case 6 can be simultaneously reduced. As a result, for example where electronic instruments are housed in the case 6, steam and oxygen leading to the corrosion can be simultaneously reduced, so that the progress of corrosion can be suppressed.

Figure 3:
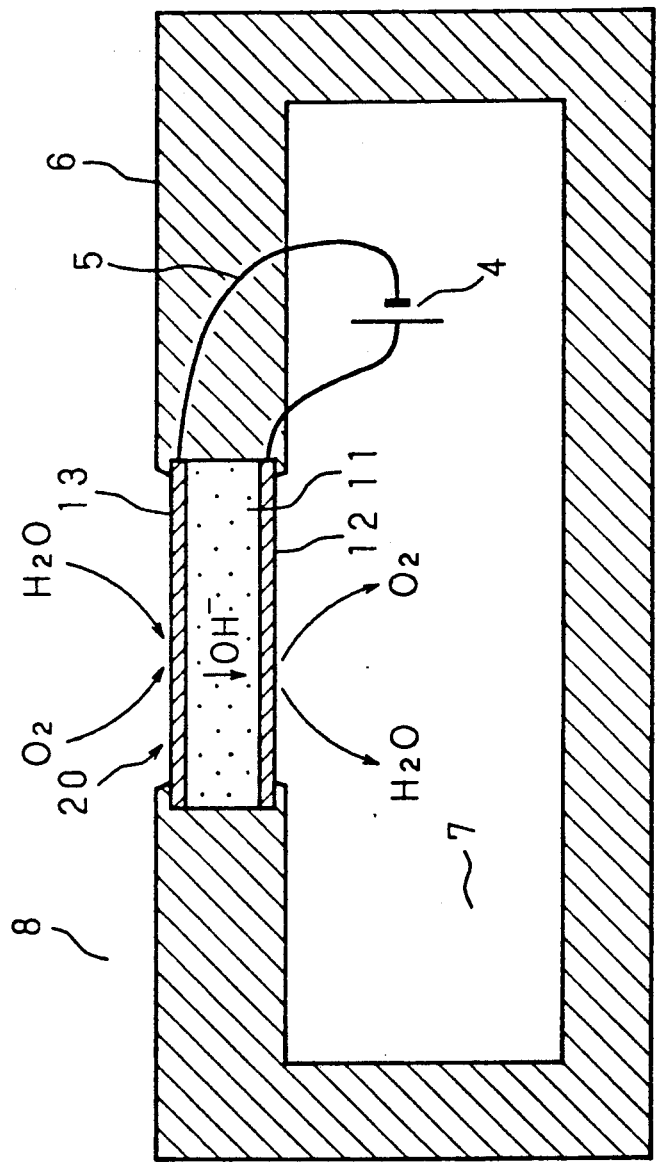
FIG. 3 is a sectional view showing a working condition of a second preferred embodiment according to the present invention.

FIG. 3 shows a working condition of the second preferred embodiment according to the present invention. Referring to FIG. 3, same reference numerals as in FIG. 2 designate same parts as in FIG. 2. In this second preferred embodiment the surface of the anode 12 is in contact with the ambient atmosphere 7 inside the case 6 while the surface of the cathode 13 is in contact with the atmospheric air 8.

Next, the operation is described.

The reaction expressed by the above described equation (3) occurs between steam and oxygen in the atmospheric air 8 on the cathode 13 and the resulting hydroxide ions are transferred from the cathode 13 toward the anode 12 through the anion exchanger polymer electrolyte 11. And, the reaction expressed by the above-described equation (4) occurs on the anode 12. And, as a whole, steam and oxygen in the atmospheric air 8 are transferred to the ambient atmosphere 7 inside the case 6 through the cell 20.

Accordingly, in this second preferred embodiment the humidity and the oxygen-concentration within the case 6 can be simultaneously increased. As a result, the accelerated corrosion test for an electronic instrument and the like housed in the case 6 can be easily carried out.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. An air conditioning method for reducing a humidity and an oxygen-concentration within a case, comprising the steps of:
   arranging a cell having anode, a cathode and an anion exchanger polymer electrolyte sandwiched therebetween so that a surface of said anode is in contact with an atmosphere outside said case and a surface of said cathode is in contact with an atmosphere inside said case; and
   applying DC voltage between said anode and said cathode, said DC voltage set within a range bringing about no generation of hydrogen from said cathode.

2. An air conditioning method as set forth in claim 1, wherein said DC voltage is set at a range of 2 V to 3 V.

3. An air conditioning apparatus for reducing a humidity and an oxygen-concentration within a case, comprising;
   a cell which has an anode, a cathode and an anion exchanger polyer electrolyte sandwiched therebetween and arranged so that a surface of said anode is in contact with an atmosphere outside said case and a surface of said cathode is in contact with an atmosphere inside said case; and means for applying DC voltage between said anode and said cathode, said DC voltage set within a range bringing about no generation of hydrogen from said cathode.

4. An air conditioning apparatus as set forth in claim 3, wherein said anion exchanger polymer electrolyte is formed of a film made of a fluororesin having an amino group.

5. An air conditioning apparatus as set forth in claim 3, wherein said cathode is formed of a porous thin film made of platinum.

6. An air conditioning apparatus as set forth in claim 3, wherein said anode is formed of a porous thin film made of platinum.

7. An air conditioning method for increasing a humidity and an oxygen-concentration within a case, comprising the steps of;
   arranging a cell having an anode, a cathode and an anion exchanger polymer electrolyte sandwiched therebetween so that a surface of said anode is in contact with an atmosphere inside said case and a surface of said cathode in contact with an atmosphere outside said case; and applying DC voltage between said anode and said cathode, said DC voltage set within a range bringing about no generation of hydrogen from said cathode.

8. An air conditioning method as set forth in claim 7, wherein said DC voltage is set at a range of 2 V to 3 V.

9. An air conditioning apparatus for increasing a humidity and an oxygen-concentration within a case, comprising:

a cell which has an anode, a cathode and an anion exchanger polymer electrolyte sandwiched therebetween and arranged so that a surface of said anode is in contact with an atmosphere inside said case and a surface of said cathode is in contact with an atmosphere outside said case; and means for applying DC voltage between said anode and said cathode, said DC voltage set within a range bringing about no generation of hydrogen from said cathode.

10. An air conditioning apparatus as set forth in claim 9, wherein said anion exchanger polymer electrolyte is formed of a film made of a fluororesin having an amino group.

11. An air conditioning apparatus as set forth in claim 9, wherein said cathode is formed of a porous thin film made of platinum.

12. An air conditioning apparatus as set forth in claim 9, wherein said anode is formed of a porous thin film made of platinum.

* * * * *